Feb. 3, 1931.　　　W. L. MUELLER　　　1,790,876
BAKER'S OVEN
Filed Nov. 7, 1929　　　3 Sheets-Sheet 3
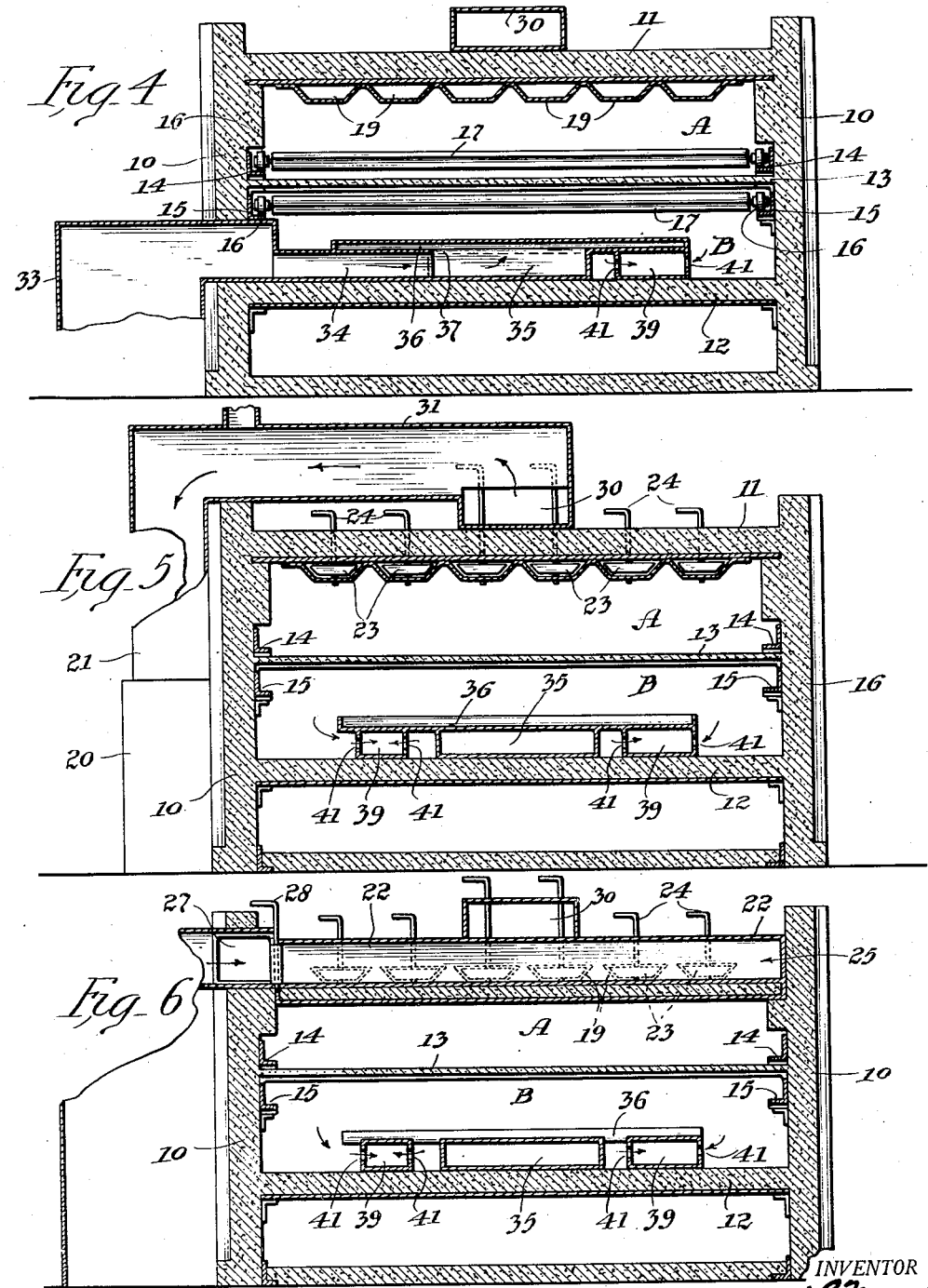

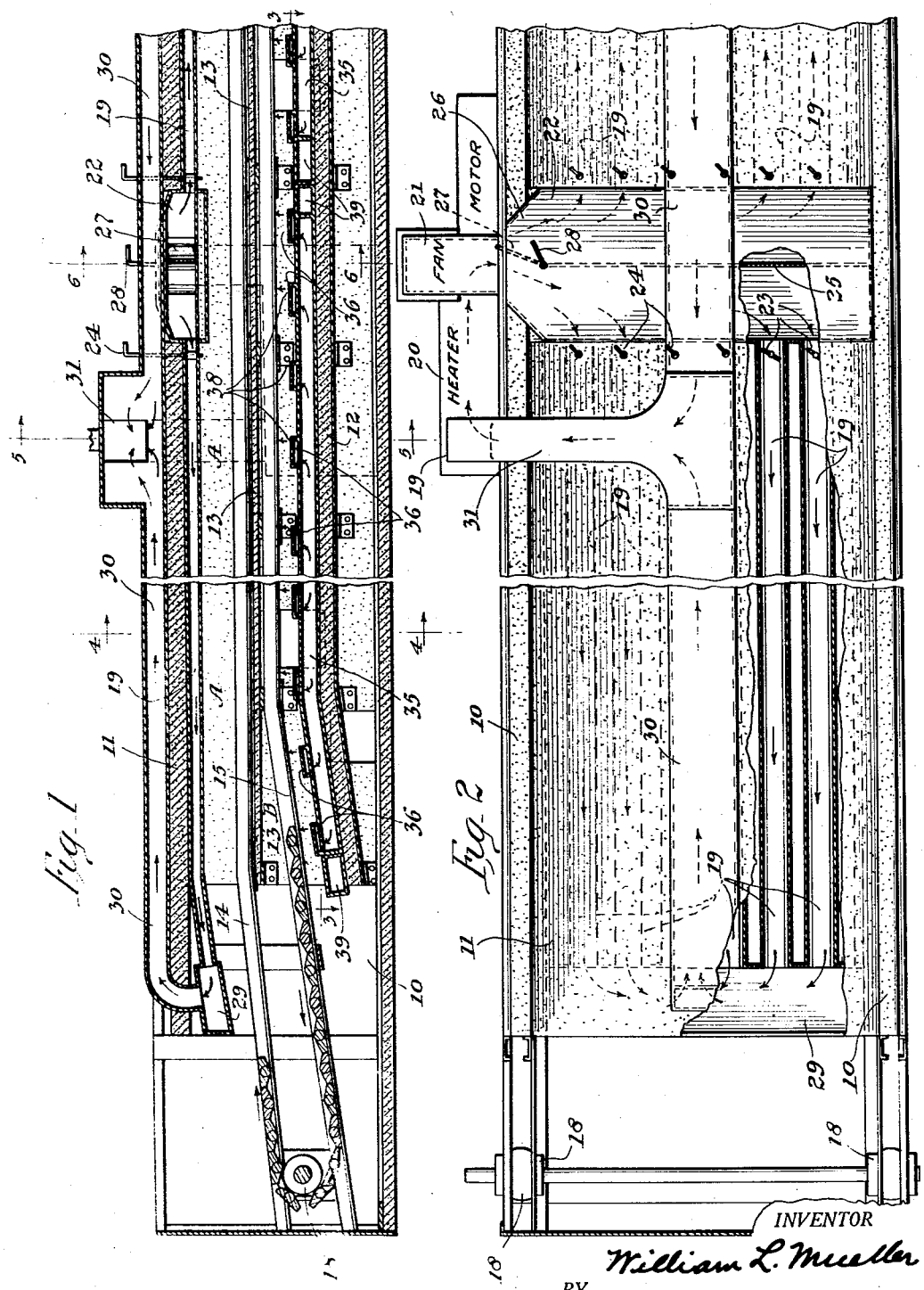

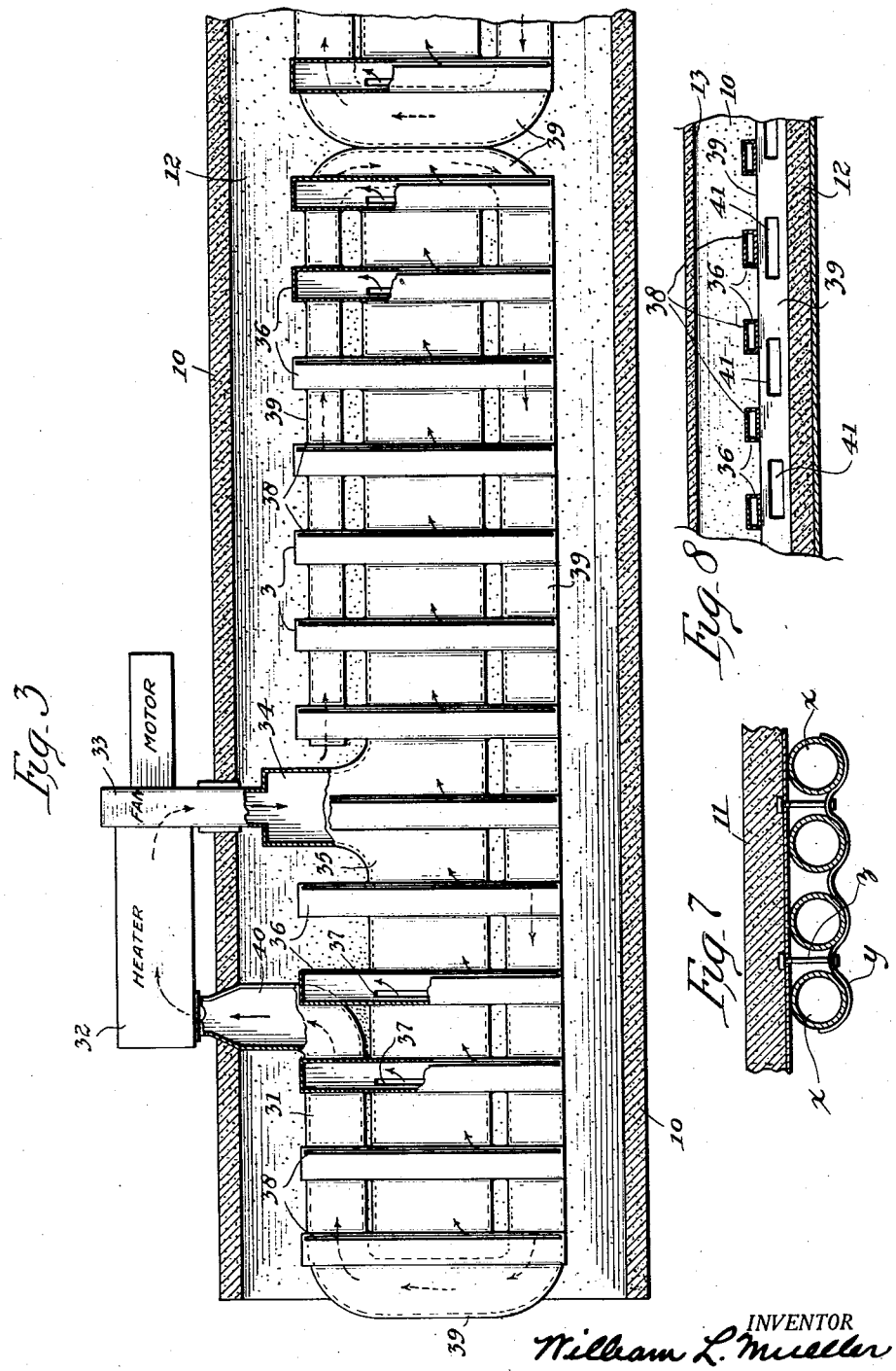

Patented Feb. 3, 1931

1,790,876

UNITED STATES PATENT OFFICE

WILLIAM L. MUELLER, OF LA GRANGE, ILLINOIS, ASSIGNOR TO THE PETERSEN OVEN COMPANY, OF CHICAGO, ILLINOIS, A CORPORATION OF ILLINOIS

BAKER'S OVEN

Application filed November 7, 1929. Serial No. 405,481.

This invention relates to ovens for producing bakery goods and it has more particular reference to what is known as a "traveler" oven wherein loaves of bread are baked upon a longitudinally moving hearth. Specifically, the structure appertains to the arrangement of the heating conduits or ducts in the baking chamber and in the lower compartment through which the return run of the moving hearth travels from the discharge end to the feed end of the oven. Said baking chamber and said lower compartment are both heated by re-circulating the heated air. In the present oven the interior is divided into upper and lower sections by means of a horizontal partition or wall so as to provide a lower compartment through which the traveler hearth makes its return movement and an upper or superposed baking chamber through which the hearth moves with the goods being baked.

It is one of the objects of this invention to provide separate or independent means for heating and controlling the heat of the air in these two sections of the oven. A further object of this invention is to provide for an even distribution of the heat in all portions of each section of the oven. With this system the return run of the traveler hearth is heated separately from the baking chamber so that the stones forming the floor of the hearth receive the loaves of bread without chilling the latter, and the hearth being hot results in an even baking of both the top and bottom of the loaf. Further objects reside in providing a novel arrangement of the ducts or conduits so that one or more units thereof may be employed for ovens of different sizes and capacities. The oven is simple to operate, unique in the construction and arrangement of its parts, and it is capable of being readily installed, and it may be increased in size at any time by adding extra units.

It is preferred to carry out this invention and to accomplish the numerous objects thereof in substantially the manner hereinafter fully described and as more particularly pointed out in the claims, reference being herein made to the accompanying drawings that form a part of this specification.

In the drawings:—

Figure 1 is a central longitudinal vertical section of the traveler oven made in accordance with this invention.

Figure 2 is a top plan view, partly broken away, of the structure shown in Figure 1, and showing the arrangement of the flues for heating the upper or baking chamber.

Figure 3 is a horizontal longitudinal section, on line 3—3 of Figure 1, showing the disposition of the flues for heating the lower or return compartment for the traveling hearth.

Figure 4 is a vertical transverse section taken on line 4—4 of Figure 1, and looking in the direction of the arrows.

Figure 5 is a vertical transverse section taken on line 5—5 of Figure 1, and looking in the direction of the arrows.

Figure 6 is a vertical transvere section taken on line 6—6 of Figure 1, and looking in the direction of the arrows.

Figure 7 is a transverse vertical section showing a portion of a modified construction of the heating ducts or conduits that may be used in the baking chamber.

Figure 8 is fragmentary view showing the lower heating system in elevation.

The drawings are to be understood as more or less schematic for the purpose of illustrating a typical or preferred form in which the structure may be made, and in said drawings the same reference characters have been employed to designate like parts wherever they appear throughout the several views.

The oven is an enclosed structure consisting of vertically disposed longitudinal side walls, 10, 10, that are connected at their upper portions by the roof or top 11, and there is a longitudinal horizontal wall 12 spaced above the floor or other support upon which the walls are erected. Intermediate the top or roof 11 and the wall 12 there is a partition 13 that divides the interior of the structure into upper and lower chambers A and B respectively, the former comprising the baking chamber and the latter comprising the compartment through which the return run of the traveler hearth moves from the discharge end of the oven back to the feed end thereof. Suitable tracks 14 are mounted upon the side walls in the baking chamber A just above the partition 13, and similar tracks 15 are mounted upon the side walls in the return compartment B immediately below said partition.

These tracks afford guides for the rollers 16 of the traveling hearth 17 so that through suitable driving mechanism the hearth 17 may be slowly moved from the feed end of the baking chamber to the discharge end thereof at the speed required for making the loaves of bread, and at both the feed and discharge ends of the oven there are sprockets or rollers 18 over which the traveler hearth moves so as to reverse its direction of movement and return it to the feed end through the lower compartment B.

In order to secure the proper degree of temperature in the baking chamber, during the transit of the goods therethrough, suitable ducts 19 are provided, that are formed from sheet-metal, substantially in the shape in cross section as shown in Figure 4. In lieu of ducts 19 it is obvious that pipes $x$ might be employed as shown in section in Figure 7, said pipes being supported upon undulated straps $y$ that are hung from the top or roof 11 by means of elongated bolts $z$. These ducts 19 have heated air passing through them, and on account of their shape they will radiate heat in the baking chamber sufficiently to bake the loaves passing through the latter. However, the air in these ducts is not discharged into the baking chamber, so that the latter is kept free from foreign matter that might be blown into the same as would be the case where outside air is discharged into the baking chamber.

Means are provided upon the exterior of the oven for heating the air and forcing it into the ducts 19. These means consist of a heater of any type that is suitable for the purpose, preferably using gas as a fuel, said heater being enclosed within a walled housing 20 into which air is discharged through a vertical flue 21, on the outside of the adjacent side wall of the oven structure. After being heated the air is withdrawn from the housing 20 and is blown, by means of a fan enclosed in a housing 21, upwardly through a vertical flue to the top of the oven where it passes into a distributor 22 that extends transversely across the oven in the manner shown in Figures 1 and 2. The ducts 19 communicate with the side walls of the distributor 22 and the passage of the heated air into said ducts is controlled by butterfly dampers 23, the spindles 24 of which extend through the top wall of the oven and provide handles whereby the dampers may be operated.

The distributor is preferably made of sheet metal and is rectangular in cross section as shown in Figure 1, and intermediate its side walls it is provided with a longitudinal partition or baffle 25 to divide the current of the heated air passing therethrough to the ducts.

The end of the distributor nearest the fan flue 21 is tapered to provide a neck 26 and within this latter portion, there is a control valve 27 that is operable by means of the handle upon the outer end of its spindle 28 which is located at the adjacent end of the divider partition 25.

When an oven of considerable length is installed, it will be found desirable to place the distributor intermediate the feed and discharge ends of the structure in order that the heated air for the ducts 19 may be sent in both directions from the distributor. Such a type of oven shown in the drawings hereof, wherein it will be seen the ducts lead in both directions from the intermediately disposed distributor.

At the ends of the ducts farthest from the distributor said ducts discharge the hot air into a transversely disposed header 29 that extends transversely across the oven from side to side thereof so as to receive the air from said ducts. A return conduit 30 leads from the central portion of the top of header 29 in an upward direction to and through the roof 11 of the oven, and said conduit then extends along the roof to about the transverse plane of the flue 21 where the air enters a return flue 31 that communicates with and forms an extension of the flue 19.

As will be seen, the return flue 31 receives the air from both ends of the oven through the oppositely extending roof conduits 30 and discharge the air into the heater housing 20. In this manner the air is heated to the proper temperature for the baking chamber and is discharged by the fan into the distributor 22, which in turn feeds the heated air into the ducts 19 above the loaves of bread slowly moving below the same upon the traveler hearth 17. Upon reaching the ends of the ducts the hot air enters the headers 19 and is returned to the heater housing 20 through the roof conduit 30 and the flues 31 and 19.

The hot air from the heater does not actually enter or be discharged into the baking chamber but the radiant heat from the metal ducts 19 is utilized to bake the bread. Also it will be seen that the air in this system is re-circulated through the ducts from the heater and maintains a continuous circuit that may be controlled in different portions of the baking chamber by regulating the valves 23.

Under ordinary conditions the return run of the traveler hearth while it is passing through the lower portion of the oven below the baking chamber would become chilled or cooled due to the fact that the temperature in the lower compartment would be considerably lower than that in the upper or baking chamber, and should the stones forming the hearth 17 be moved into the feed end of the baking chamber, they would chill the loaves of dough placed upon the hearth preparatory to baking. This obviously is objectionable because it would not only chill the dough and retard bottom baking, but a portion of the heat units in the baking chamber would be absorbed by the colder stones.

In order to overcome the above described objection provision is made for heating the hearth while it travels back to the feed end of the oven, so that the loaves of dough when placed thereon will not be chilled nor will the temperature of the stones have to be raised by the heat units in the baking chamber. Furthermore, by having the hearth hot when it receives the dough there is a uniform baking of both the top and bottom of the loaves of bread.

The structure employed for heating the return compartment consists of a heater enclosed in a housing 32 from which the heated air is discharged by a fan or blower arranged in a casing 33 and disposed preferably upon the exterior of the oven walls. The hot air is blown into the interior of the oven structure where it enters a conduit 34 that leads to an elongated distributor 35 extending longitudinally of the return compartment. Suitable discharge ducts 36 are arranged in parallel relation to each other and extend transversely across the distributor 35 beyond the side walls of the latter. Both the distributor 35 and the ducts 36 are rectangular shape in cross section and made of sheet-metal, and they communicate with each other through intermediate openings 37 so that the hot air in the distributor will enter the ducts 36. Elongated discharge slots 38 are made along the upper portions of the ducts so that the hot air may be discharged upwardly below the return run of the traveler hearth within the lower compartment of the oven, said slots being off-set or to one side of the slots 37 at the bottoms of the transverse ducts.

The conduit 34 and the distributor 35 rest upon the lower wall 12 of the oven structure in order to position them below and adjacent the return run of the hearth. The hot air is fed by the fan into the distributor 35 and from thence into the transverse ducts 36 and discharged through the slots 38 into the return compartment B where the air heats the stones comprising the traveling hearth to the proper temperature.

In order to return the air from the compartment B to the heater casing 32 for re-heating, a conduit 39 of rectangular cross-section extends around the outside of the elongated distributor 35 and, as seen in Figure 3, the transverse dimensions of said conduit 39 are increased so as to enlarge its capacity as additional air is taken into the same. This may be seen in Figure 3. The conduit 39, adjacent the transverse plane of the heater housing 32, is provided with a lead-in 40 that extends to and communicates with the housing 32 of the heater. The side walls of the conduit 39 are provided with slots 41 through which the air may enter the conduit from the lower compartment B and be returned to the heater where said air is reheated and is again discharged into the compartment B through the distributor 35 and the transverse ducts.

Thus it will be noted the air in the return compartment is re-heated and re-circulated therein by means of the structure just described. For convenience it is preferred to support the conduit 39 upon the horizontal wall 12 below the over-hanging portions of the transverse ducts 36 and when an oven of large proportion is used two or more of the above described re-circulating and re-heating systems are employed in the lower compartment B as seen in Figure 3 of the drawing.

It is obvious that modification and re-arrangement of the structure herein described may be made without departing from the principles involved.

It is to be understood that the drawings and the detailed description herein are given for the purpose of clearness of understanding only and that no unnecessary limitations are to be understood therefrom, but the appended claims are to be construed as broadly as permissible in view of the prior art.

What I claim is:—

1. A bake oven comprising a housing, a horizontal partition dividing the interior into a longitudinal baking chamber in its upper portion and a separate longitudinal compartment in its lower portion, a continuous traveler hearth movable through said chamber and said compartment, heating flues at the ceiling of the baking chamber and extending throughout the length thereof, means for conducting heated air into said flues, other means for conducting said air out of said flues, a heater and blower structure connecting said in and out means and establishing continuous circulation through said flues, a plurality of hot-air discharge ducts below the portion of the traveler hearth in said bottom compartment, means for supplying hot air to said discharge ducts, and means for withdrawing air from said compartment and returning said air to said supply means for re-circulation in said compartment.

2. A bake oven comprising a housing, a horizontal partition dividing the interior into a longitudinal baking chamber in its upper portion and a separate longitudinal compartment in its lower portion, a continuous traveler hearth movable through said chamber and said compartment, heating flues at the ceiling of the baking chamber and extending throughout the length thereof, devices in said flues for individually controlling the flow of heated air through the same, means for conducting heated air into said flues, other means for conducting said air out of said flues, a heater and blower structure connecting said in and out means and establishing continuous circulation through said flues, a plurality of hot-air discharge ducts below the portion of the traveler hearth in said bottom compartment, means for supplying hot air to said discharge ducts, and means for withdrawing air from said compartment and returning said air to said supply means for re-circulation in said compartment.

Signed at Chicago, Cook County, Illinois, the 21st day of August, 1929.

WILLIAM L. MUELLER.